United States Patent [19]

Daman et al.

[11] 4,004,903
[45] Jan. 25, 1977

[54] METHOD OF AND APPARATUS FOR INCREASING THE MELTING RATE OF GLASS MAKING MATERIALS

[75] Inventors: Lloyd W. Daman, Pemberville; Earl A. Hille, Elmore; Donald E. Shamp, Millbury, all of Ohio

[73] Assignee: Libbey-Owens-Ford Company, Toledo, Ohio

[22] Filed: June 5, 1975

[21] Appl. No.: 584,104

[52] U.S. Cl. .................................. 65/135; 65/335; 214/18 GD
[51] Int. Cl.² .......................................... C03B 3/00
[58] Field of Search ...................... 65/27, 135, 335; 214/18 GD

[56] References Cited
UNITED STATES PATENTS

| | | | |
|---|---|---|---|
| 1,623,057 | 4/1927 | Kingsley | 65/335 X |
| 2,533,826 | 12/1950 | Lyle | 65/27 X |
| 2,624,475 | 1/1953 | Henry et al. | 65/335 X |
| 3,167,191 | 1/1965 | Zellers | 65/335 X |
| 3,587,881 | 6/1971 | Kurz | 65/335 X |
| 3,780,889 | 12/1973 | Frazier | 65/335 X |

Primary Examiner—Robert L. Lindsay, Jr.
Attorney, Agent, or Firm—Collins, Oberlin & Darr

[57] ABSTRACT

A method of and apparatus for feeding glass making materials into the forward end of a continuous glass melting furnace whereby the melting rate of the materials is increased. In accordance with the improved method, the glass making materials are continuously deposited on the molten glass bath in the doghouse of the furnace, periodically compacted to remove entrapped air therefrom, and advanced into the furnace while thus compacted. The apparatus has a reciprocating pressing member which is periodically advanced from a rest position in a raised attitude over a transverse row of newly deposited glass making materials, lowered to compact the materials between it and the surface of the molten glass bath, and advanced in its lowered attitude to move the compacted glass making materials into the melting end of the furnace.

10 Claims, 8 Drawing Figures

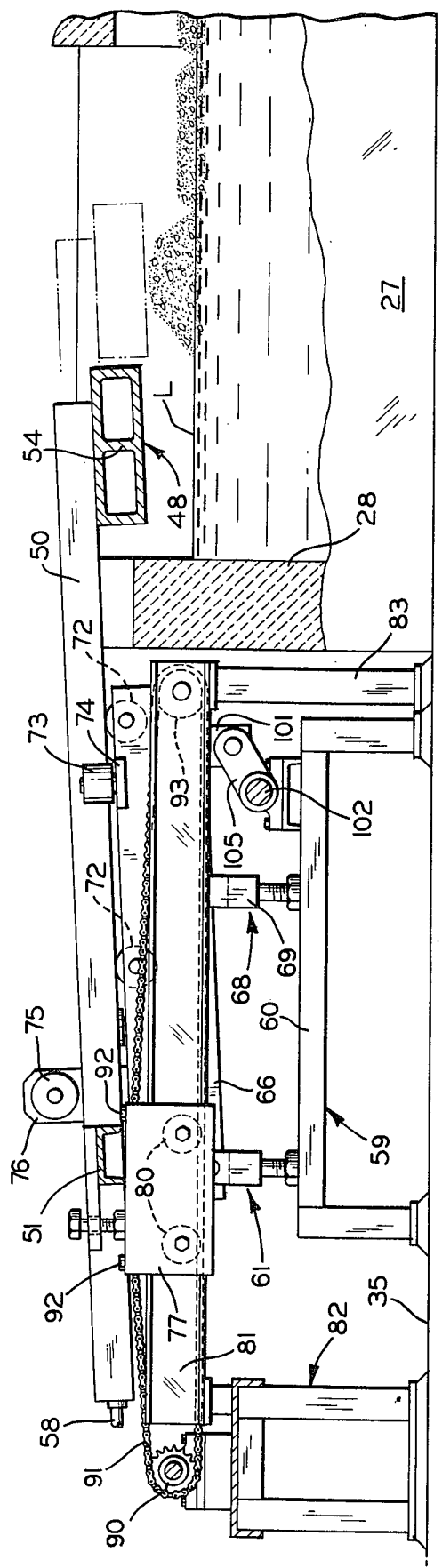
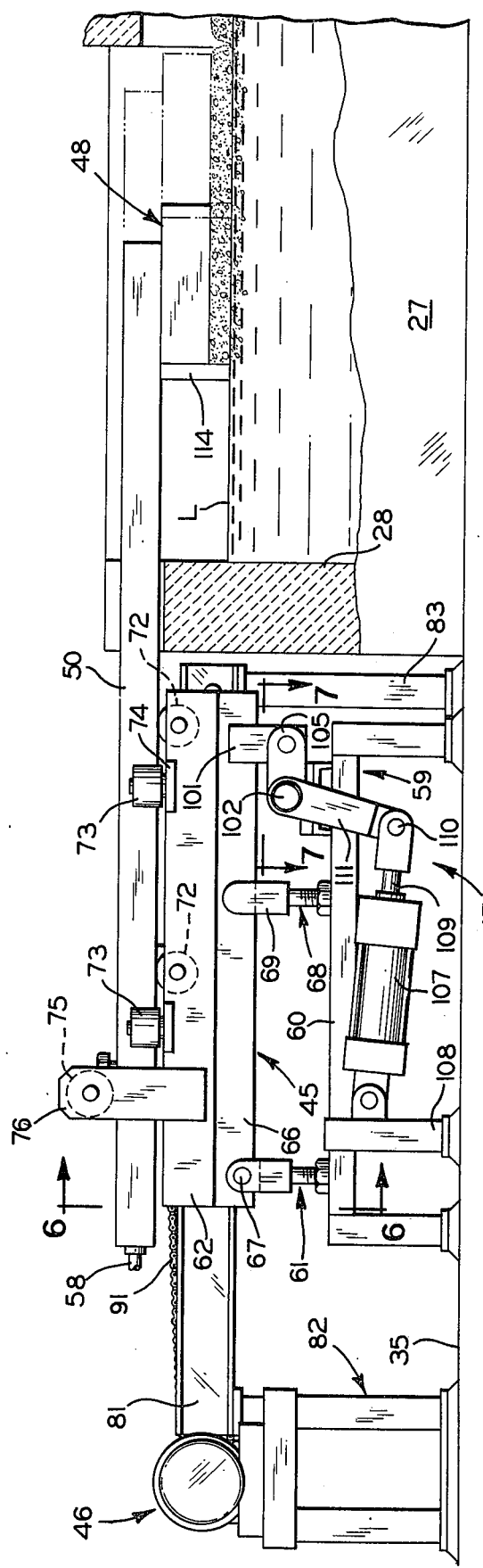

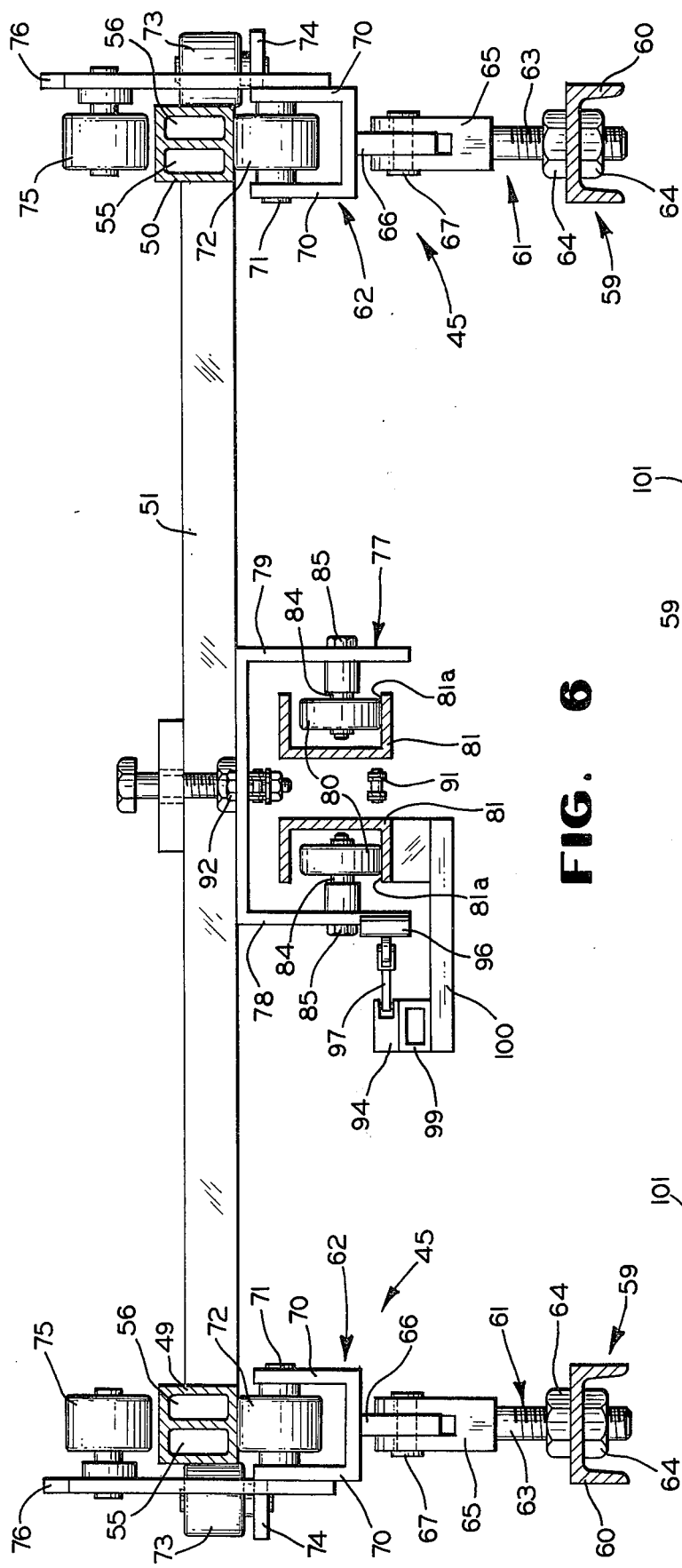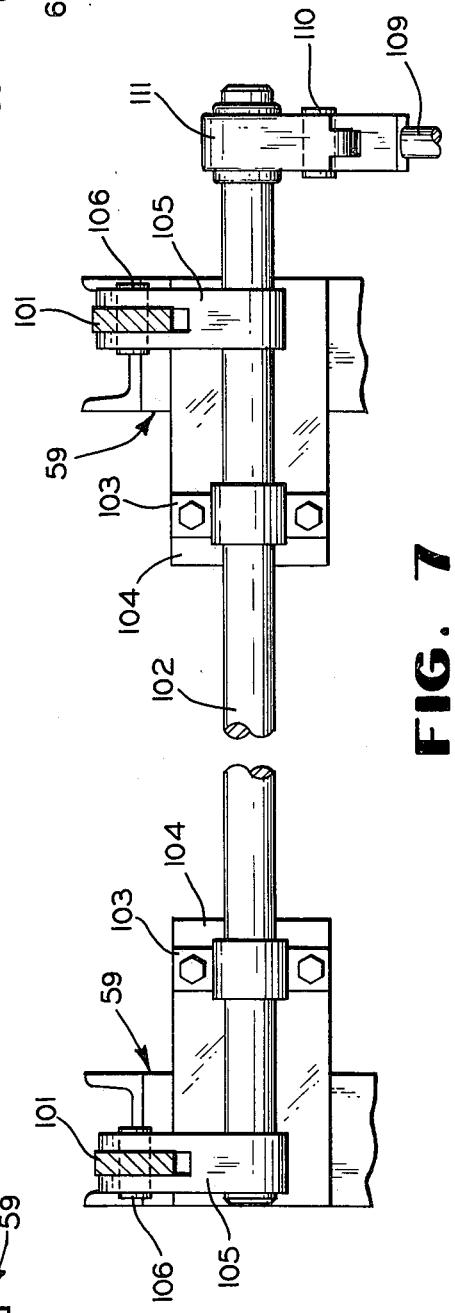

METHOD OF AND APPARATUS FOR INCREASING THE MELTING RATE OF GLASS MAKING MATERIALS

BACKGROUND OF THE INVENTION

1. Field of the Invention

The present invention relates broadly to the art of making glass and, mmore particularly, to an improved method and apparatus for supplying glass making materials to a tank furnace wherein the melting rate of the materials is substantially increased.

2. Description of the Prior Art

In melting glass making materials in conventional continuous tank-type furnaces, considerable difficulty has been encountered in obtaining uniform melting of the materials and utilizing the maximum efficiency of the heat supplied because of the normal practice of supplying heat from overhead flames to melt the raw materials and refine the melted materials at elevated temperatures. Accordingly, many methods and devices have been proposed for feeding glass making materials into continuous glass melting furnaces in efforts to secure uniform melting of the materials in an efficient manner and minimum period of time.

Among the types of feeding devices employed in the past are those which deposit glass making materials in localized lumps or piles at various locations adjacent the entrance end of the melting tank. The material, as it is melted, flows toward the exit end of the tank because of the thermal currents naturally occurring in the tank and the withdrawing of glass from its exit end. In other types, a layer of glass making materials is continuously deposited on the molten glass in the so-called doghouse adjacent the entrance end of the tank and mechanically pushed into the melting tank to form a blanket of material on top of the molten glass in the tank. It has been observed that when glass making materials are dropped by gravity so as to fall freely onto the surface of the molten glass bath, air is entrapped in the materials and acts as an insulating medium, preventing heat from reaching the interior of the piles or blanket of unmelted glass making materials. Thus, higher temperatures are required to melt the materials in a given time, or if normal melting temperatures are employed, the time for melting the materials is substantially increased.

Tests have shown that compacted glass making materials have a faster heat-up rate than uncompacted glass making materials and thus, will reach their melting point in a shorter period of time than the time required for the uncompacted glass making materials to reach the melting point. Efforts have been made in the past to compact or densify the glass making materials before delivering them to the melting furnace. For example, in U.S. Pat. No. 3,325,298, various methods are disclosed for densifying batches of glass making materials in the mixing devices before they are delivered to the melting furnace. However, special handling may be required to maintain this densification as the glass making materials are removed from the mixer and deposited through the feeder into the forward end of the melting furnace.

SUMMARY OF THE INVENTION

Briefly stated, the invention is based on the discovery that conventional glass making materials such as batch and cullet can be melted more rapidly and efficiently by depositing such materials in the form of an elongated transverse strip onto the surface of the molten glass in advance of the melting area of the continuous tank furnace, compacting the strip to remove entrapped air therefore and then moving each such strip against a previously deposited compacted strip and toward the melting area to thus provide a continuous transversely ribbed blanket of finely divided compacted glass making materials over the molten bath.

OBJECTS AND ADVANTAGES

The primary object of this invention is to improve the rate, quality and control of melting in conventional glass tank furnaces.

Another object of this invention is to provide a process for removing air entrapped in the deposited batch materials to increase their thermal conductivity.

Another object is to accomplish these things by supplying the batch materials as a layer of compacted transverse strips, sequentially moving the same as a substantially continuous blanket into the tank furnace in definite sequencees of movement at regular intervals, and then causing said strips to become distributed over a large surface area of the molten glass contained in such a furnace.

Another object of the invention is to remove air entrapped in deposited batch materials, thus increasing its bulk density and consequently increasing its melting rate.

Another object of the invention is to provide a novel automatically operating pressing apparatus for compacting and moving layers of batch materials as a compacted blanket toward the melting zone of the tank furnace in predetermined amounts.

Other objects and advantages of the invention will become more apparent during the course of the following description when read in connection with the accompanying drawings.

BRIEF DESCRIPTION OF THE DRAWINGS

In the drawings, wherein like numerals are employed to designate like parts throughout the same:

FIG. 4 is a enlarged longitudinal vertical section taken on line 4—4 of FIG. 3 and illustrating, partly in cross section, the batch compacting and moving apparatus in its retracted raised attitude;

FIG. 5 is an enlarged view similar to FIG. 4 illustrating the batch compacting and moving apparatus in its partically advanced lowered attitude;

FIG. 6 is an enlarged, fragmentary end sectional elevation, taken on line 6—6 of FIG. 5, illustrating the compacting and moving apparatus support means;

FIG. 7 is an enlarged, fragmentary horizontal plan view, taken on line 7—7 of FIG. 5, illustrating the raising and lowering means for the compacting and pushing apparatus.

DESCRIPTION OF THE PREFERRED EMBODIMENT

Figure 1:
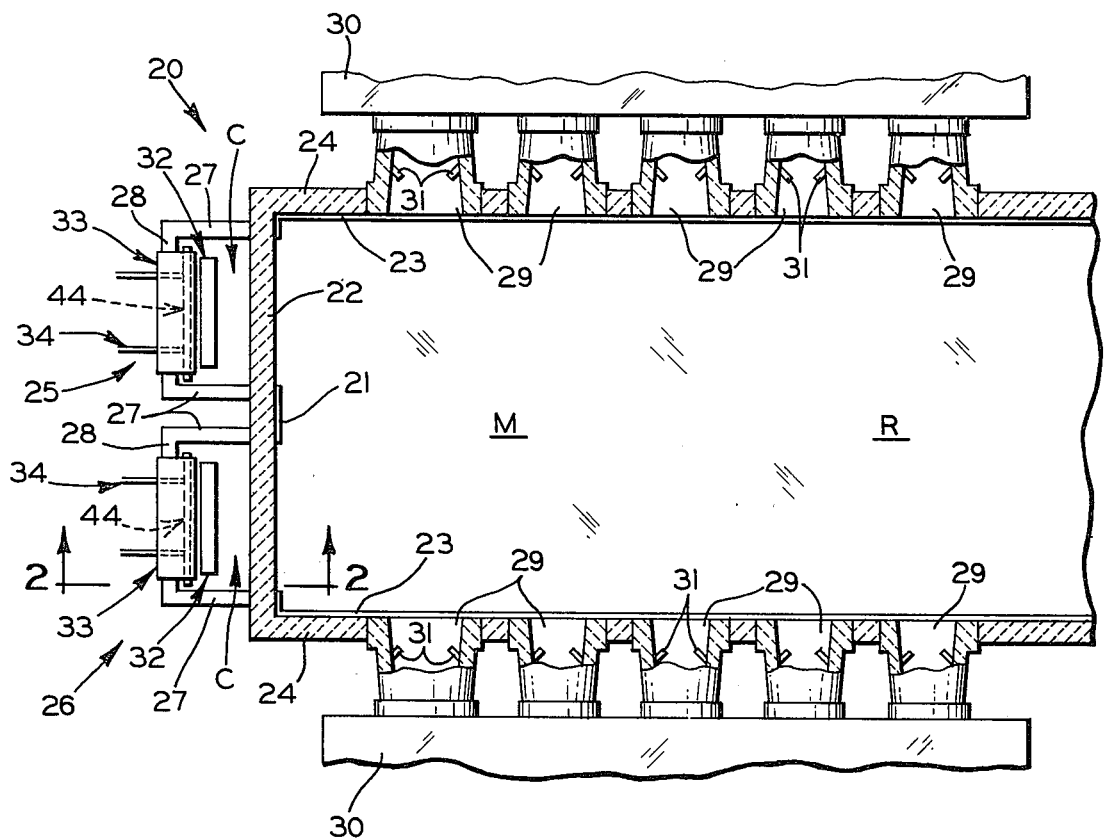
FIG. 1 is a plan view of the charging and melting end of a glass melting tank furnace.

With reference now to the drawings and particularly FIG. 1, there is shown a glass melting tank furnace generally designated by the numeral 20 and including a lower end wall 21, upper end wall 22, and lower and upper side walls 23 and 24, respectively. Opening outwardly from the lower end wall 21 are spaced charging or doghouse areas 25 and 26, each doghouse area being defined by side walls 27 and an end wall 28. As is customary with this type of glass melting furnace, the batch materials are fed into the doghouse areas as at C, moved forwardly into the melting zone M of the furnace 20 and, when reduced to a molten and homogeneous consistency, flowed into a refining zone R from which the properly conditioned glass is discharged through an orifice in the outlet end wall (not shown) of the furnace.

As is conventional in tank furnaces of the regenerative type, the oppositely disposed upper side walls 24 are provided with suitably spaced burner ports 29 communicating with regenerator chambers 30. As seen in FIG. 1, the highly heated atmosphere of the melting zone M of the furnace is maintained at regulated temperatures by gaseous flames produced by burners 31 arranged in each of the ports 29 at one side of the furnace, with the waste products of combustion exhausting through the opposed ports to heat the associated regenerator chamber 30 at the other side. After a predetermined period of time, firing of the furnace is reversed so that the gaseous flames originate at the burners 31 and the ports 29 of the opposite side wall of the furnace.

According to the method of the present invention the glass making materials, consisting of proportionate amounts of raw pulverulent or granular batch material and scrap or cullet glass, are supplied to the charging area C in a manner such that an individual elongated row or strip is peridically built upon the upper level or surface L of the molten glass G in each doghouse, substantially crosswise thereto between the side walls 27. At regulated intervals, this row or accumulation of materials is first compacted against the buoyant molten glass and then moved or pushed forwardly and against a previously deposited compacted row of material. This produces, in effect, a substantially continuous compacted blanket made up of successive individual rows and so having a more or less ridged upper surface. As herein contemplated, the rate at which the batch materials and cullet glass are supplied to the furnace from both of the doghouse is co-ordinated with the productive demand of the furnace, and to this end of rows of batch material are first compacted and then moved forwardly at a controlled rate of movement which determines the spacing of the ridges therein and the speed at which the batch material enters the actual melting zone of the furnace.

Thus, each doghouse 25 and 26 has associated therewith apparatus generally designated by the numeral 32 for supplying the raw pulverulent or granular material, apparatus for supplying the scrap or cullet glass indicated by the numeral 33, and a batch compacting and moving device by the numeral 34. As will be noted in FIG. 2, the apparatus 32 and 33 in each instance is substantially superimposed over the open upper area of the doghouse while each compacting and moving device is supported on the factory floor 35, outwardly of the end walls 28 of the doghouse, and is operatively disposed to function beneath the respective apparatus for supplying the cullet and batch material.

Figure 2:
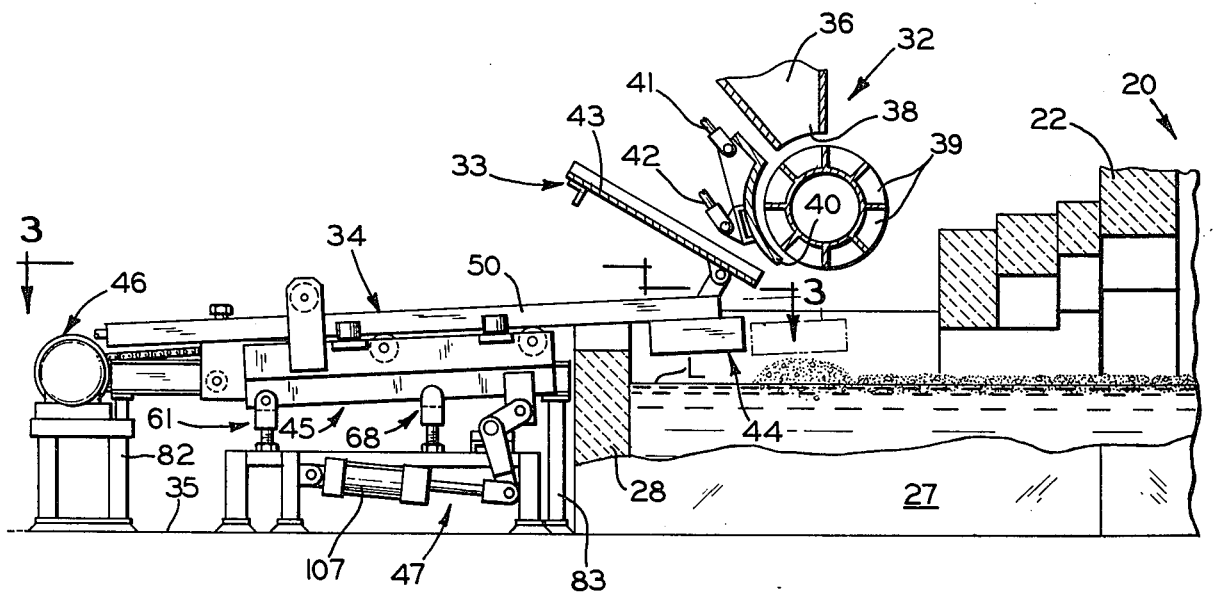
FIG. 2 is a longitudinal vertical section taken on line 2—2 of FIG. 1 and illustrating, partly in cross section, batch feeding apparatus constructed in accordance with the present invention.

More particularly, as viewed in FIG. 2, the batch feeding apparatus 32 includes a supporting framework (not shown) on which is mounted a hopper 36 communicating at its open lower end with a continuously rotating compartmented feed roll 37 journalled at its opposite end on the framework. Consequently, the raw granular batch material will be directed from the hopper 36 which is continuously filled in a well-known manner through the open end 38 thereof into the several compartments of the feed roll 37 as they pass therebeneath. A gauge plate 40, pivotally and adjustably mounted on the framework by rods 41 and 42 is adapted to control the amount of batch material contained in each compartment.

The cullet glass is supplied onto an angularly disposed chute 43 of the apparatus 33 in a well-known manner for discharge into the doghouses 25 and 26. The chute 43 is disposed above the open end area of each doghouse and, as seen in FIG. 2, the chute in each instance is adapted to discharge the material onto the surface L of the molten glass in a area adjacent to the area where the raw granular batch material is deposited to first build up a layer of cullet glass, located in crosswise relation to the doghouse side walls 27. As hereinabove mentioned, a row of deposited material comprising a layer of cullet glass and a layer of batch material, is periodically moved forwardly by the compacting and moving device 34.

Figure 3:
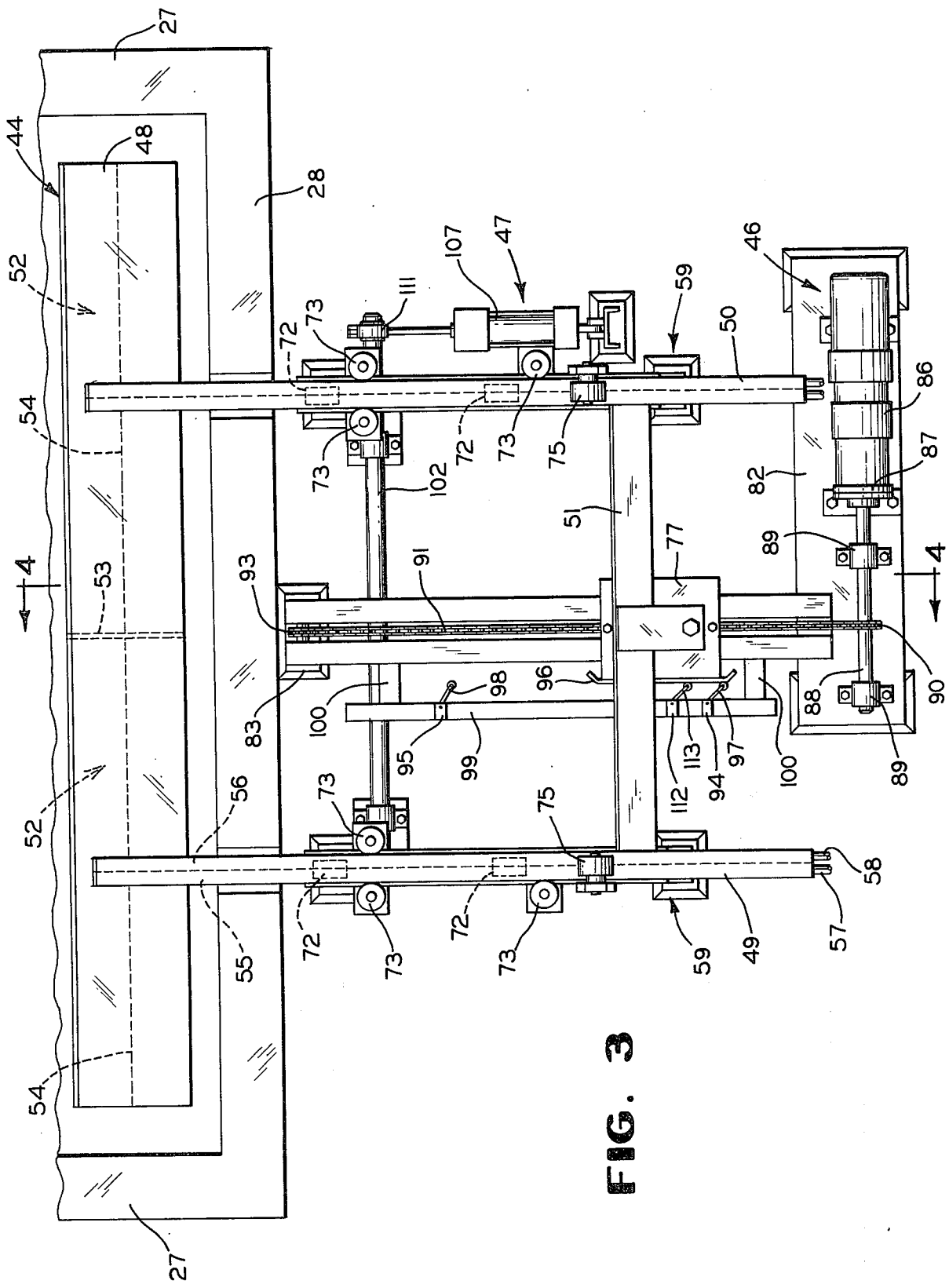
FIG. 3 is a horizontal section taken on line 3—3 of FIG. 2.

The compacting and moving device 34, as best illustrated in FIGS. 3, 4 and 5, includes a generally horizontally disposed and reciprocally supported hollow pressing member 44 that is adapted to be moved forwardly and back with reference to a framework 45 during the operation of a drive assembly generally designated by the numeral 46. An end of the framework 45, and thus the member 44, is adapted to be moved substantially vertically up and down by a crank mechanism generally designated by the numeral 47. More particularly, the member 44 has a relatively wide elongated tubular body portion 48 that is integrally connected to a pair of tubular support arms 49 and 50 arranged in spaced, parallel relation to one and substantially perpendicular or normal to the body portion. Adjacent their outer ends, the arms 49 and 50 are interconnected by a laterally disposed bar 51. The body 48 is divided into chambers 52 by a medially located vertically disposed transverse partition 53, the chambers being partially subdivided into side-by-side areas by vertically disposed longitudinal partitions 54 (see FIG. 4) to provide for the continuous flow of a coolant such as water through the areas of each chamber. For this purpose, each support arm 49 and 50 is formed of two rectangular tubes to provide passageways 55 and 56 attached, respectively, to supply and drain pipes 57 and 58. The plates which are, of course, disposed above the level or surface of the molten glass in the doghouses, are thus maintained at a sufficiently low temperature as to reduce the tendency of the batch materials to adhere thereto.

The framework 45, on which a pressing member 44 is carried, includes a stationary base or platform 59 on the factory floor 35 and having parallel channel members 60 extending longitudinally toward the end doghouse walls 28. Each member 60 is equipped with an adjustable, pivotal support means 61 which pivotally supports roller tracks 62 on which the arm 49 or 50 is movably carried. As best shown in FIG. 6, the adjustable pivotal support means 61 includes a threaded rod 63 provided which nuts 64 above and below the web of the channel member 60 and having a yoke fitting 65 at its upper end in which a depending flange 66 of the track 62 is pivotally carried on a pin 67. Also, each member 60 is equipped with an adjustable guide support means 68 which is similar in structure to the pivotal support means 61 except for the yoke member 69. In this instance, the sides of the yoke member 69 cooperate with the depending flange 66 of each track 62 to restrain the movement of the tracks in a vertical plane as they move about the pivot pins 67.

The tracks 62 are substantially U-shaped in cross section with vertically disposed walls 70 in which the ends of support pins 71 for horizontally disposed rollers 72 are located. The rollers 72 are adapted to support the arms 49 or 50 for movement in a substantially horizontal plane and as guided by vertically disposed rollers 73 carried by brackets 74, during the forward and back movement as produced periodically by the drive assembly 46. The end of the compacting and moving apparatus 34 carrying the body portion 48 cantilevers over the open area of the doghouse, and to this end horizontally disposed rollers 75 are provided to maintain rolling contact with the upper surface of the support arms 49 and 50. As will be noted in FIG. 6, the rollers 75 are rotatably mounted by brackets 76 secured to a wall 70 of the respective tracks 62. Accordingly, as pressing member 44 is advanced and the center of gravity of it and its supporting framework is shifted forwardly, the rollers 75 are adapted to resist upward motion of the arms 49 and 50 with consequent objectionable downward or dipping motion of the member 44. If desired, weighted members in the form of metal blocks can also be secured on the bar 51 to further counterbalance the weight of the plate.

The cross bar 51 of the device 34 is provided with a medially located depending U-shaped bracket 77 which extends longitudinally with respect to the arms 49 and 50. As best illustrated in FIGS. 3, 4 and 6, each depending wall 78 and 79 of the bracket 77 is provided with a pair of inwardly projecting wheels 80 which roll along horizontal track surfaces 81a provided by the flanges of two transversely spaced, longitudinally extending channel members 81. One end of each channel member 81 is mounted on a platform 82 and its other end is mounted on a pedestal 83. Each wheel of each pair 80 is mounted on a stub shaft 84 which is secured by bolts 85 to a depending wall 78 or 79 of the bracket 77.

The drive assembly 46 as best seen in FIGS. 3 and 4 includes a motor driven reversible gear reduction unit 86 and a clutch 87 adapted to couple the output of the gear reduction unit to a drive shaft 88. The drive shaft 88 operated by the clutch 87 is journalled in bearings 89 mounted on the platform 82 and may be equipped with a magnetic brake (not shown) alternately operable with the clutch 87. The shaft 88 mounts a sprocket 90 which, through a chain 91 whose free ends are connected by bolts 92 to the bracket 77, produces the above described forward and rearward movements of the member 44. To this end, the chain 91 is entrained around an idler sprocket 93 rotatably carried by the pedestal 83. It is thus believed apparent that the gear unit 86, upon engagement of clutch 87, will drive the chain 91 and thereby cause forward movement of the compacting and moving device 34 and then upon reversal, the rearward movement thereof.

As herein provided, the reciprocal movements of the pressing member 44 are controlled by spaced apart limit switches 94 and 95 which are located along one of the channel members 81. Referring now to FIG. 3, these limit switches 94 and 95 are positioned to be engaged by an actuating rail or member 96 secured to the bracket 77. As shown, the limit switches 94 and 95 have arms 97 and 98, respectively, which when engaged by the rail close their electrical contacts (not shown). Accordingly, when the member 44 reaches the intended terminus of its movement in one direction, for example to the right in FIG. 5, the switch 95 will be actuated to change polarity and reverse the motor of the gear reduction unit 86 to move the plate 44 in the opposite direction. As shown in FIG. 3, the switches 94 and 95 are positioned outwardly of and along a channel member 81 on a rail 99 supported by brackets 100 extending from the bottom of the channel member 81.

As previously indicated, the member 44 also is movable downwardly and upwardly and, as described hereinbefore, one end of the roller tracks 62 supporting the pressing arms 49 an 50 is pivotally mounted so that the free ends of the tracks adjacent the doghouse 25 and 26 are movable in a vertical plane. As best illustrated in FIGS. 4, 5 and 7, the free end of each track 62 is provided with a depending flange 101 for connection to the lift mechanism 47. The lift mechanism 47 generally comprises a rockable shaft 102 mounted in bearings 103, secured to a cross member 104 forming part of the frame 59. Arms 105 secured to the shaft 102 for movement therewith are connected to the depending flanges 101 by pivot pins 106. The shaft 102 is rocked between two positions by a motor 107 which may be, for example, a single or double-acting hydraulic or air cylinder. As seen in FIGS. 2 and 5, the motor 107 comprises a cylinder pivotally mounted on a pedestal 108 with its piston rod 109 connected pivotally by a pin 110 to one end of an arm 111 whose other end if fixedly secured to the rockable shaft 102 for moving the shaft between its two positions. FIGS. 2 and 4 show the tracks 62 in their raised attitude and FIG. 5 shows the tracks 62 in the lower attitude, with the pressing member 44 shown in its corresponding raised and lowered attitudes.

As described hereinafter, the downward and upward movements of the pressing member 44 are controlled by a limit switch 112 which is located on the rail 99 intermediate the limit switches 94 and 95. This limit switch 112 also is positioned to be engaged by the actuating member 96 and includes an arm 113, which when engaged by the actuating member 96, closes its electrical contact (not shown). Accordingly, when the pressing member 44 reaches an intermediate position as shown in FIGS. 2 and 4, the switch 112 will be actuated to energize the motor 107 which lowers the member 44 to compact the deposited row of glass making materials. The member 44 continues to advance during its lowering movement and as it compresses the batch material it also moves the batch material forwardly into the melting end of the furnace. When the member 44 reaches its intended terminus as previously described, the motor 107 will again be energized to raise the member 44 so that it does not contact the compacted glass making materials during its rearward movement. Although practice has shown that member 44 will, in itself, move the compacted batch material into the furnace, a skim blade 114, as shown in FIG. 5, may be attached to the rear edge of the pressing member 44 for assistance in pushing the batch forwardly.

Although the forward movement of the member 44 is continuous, the member 44 has been shown in two attitudes in certain figures for purposes of illustration. Thus, it is shown in the idle, raised attitude of the member in full line and an intermediate advanced position as indicated in broken line in FIGS. 2 and 4, and in a lowered, intermediate attitude in full line and an advanced position in broken line in FIG. 5. This distance of movement, or stroke, while quite important to the predetermined intervals of periodic forward movement of the compacted batch material on the upper level of the molten glass, also serves by the speed of movement to determine the degree with which the successively deposited rows of the material push and further compact against one another as they advance into the furnace. Thus, having established the desired proportions of raw granular batch materials and the glass cullet that are fed from the apparatus 32 and 33, the timed intervals can be established to either produce longitudinally spaced, laterally disposed, ridge-like rows of the compacted batch material or more closely spaced rows of the compacted material. Consequently, when the time periods of operation of the pressing member 44 are set up to occur at closely spaced intervals, each successive row of compacted batch material will be moved forwardly and against the preceding row to form a ridge-like blanket. Also, the speed with which the member 44 moves the material operates to further compact the rows of batch material against each other and cause forward movement of the blanket in its entirety.

In operation, and with the raw granular or pulverulent batch material being supplied to each hopper 36, the hoppers deliver the same to their respective continuously rotating compartmented feed rolls 37 which are adapted to discharge regulated amounts of the material as the compartments 39 successively pass their gauge plate 40. This discharged material builds up as a layer on the surface of the previously deposited cullet glass extending crosswise or transversely between the side walls 27 of their respective doghouse 25 and 26. Simultaneously, glass cullet is supplied onto each angularly disposed plate 43 for discharge onto the surface of the molten glass and is deposited on the surface of the molten glass as a transversely disposed row in an area immediately ahead of the area where the raw batch material is deposited and, of course, tends to build up a layer of cullet glass on which a layer of raw batch material is deposited. As viewed in FIG. 2, it will be appreciated that both the raw granular batch material and the cullet drop from their respective sources of supply a vertical distance sufficient for the member 44 to be moved downwardly and upwardly and freely movable beneath such sources. This arrangement in accordance with the method of this invention, permits the glass cullet to be delivered onto the molten glass surface in an area inwardly of the end doghouse wall 28 and positions the cullet layer so that the raw granular batch material is deposited thereon and compacted thereagainst whereby the cullet glass and raw granular batch material are effectively moved together toward the melting zone of the furnace.

As discussed in connection with the limit switches illustrated in FIG. 3, the switches are adapted to be selectively positioned to sequentially operate the compacting and moving apparatus 34 to first vertically compact the row of built-up layers of raw batch material and glass cullet and then move the compacted row of materials forwardly a predetermined distance by means of the pressing member 44. On a practical basis, this distance may be on the order of 13 inches, with the forward thrust of the member being maintained at a suitably rapid degree of movement as controlled by the gear reduction unit 86. As herein set forth, the length of motion of the pressing member also determines the degree of pushing of each deposited compacted row into the side surface of a preceding compacted row as well as the distance the blanket mass of compacted batch is advanced toward the melting zone. The limit switches are therefore employed to space the intervals of movement of the compacted batch material into the furnace and also the amount of batch material included in each deposited row. To illustrate, an established interval of 25 seconds between sequential cycles of the compacting and moving device will result in the deposition of a relatively small amount of batch in each row and consequent formation of a thin compacted blanket. Practice has shown that such a compacted batch blanket will be completely melted at the third port of the furnace. On the other hand, when the rows of batch materials are not compacted but only pushed into the furnace on the same cycle of operation as described above, the uncompacted batch blanket does not become completely melted unit it reaches the fifth port of the furnace.

Figure 8:
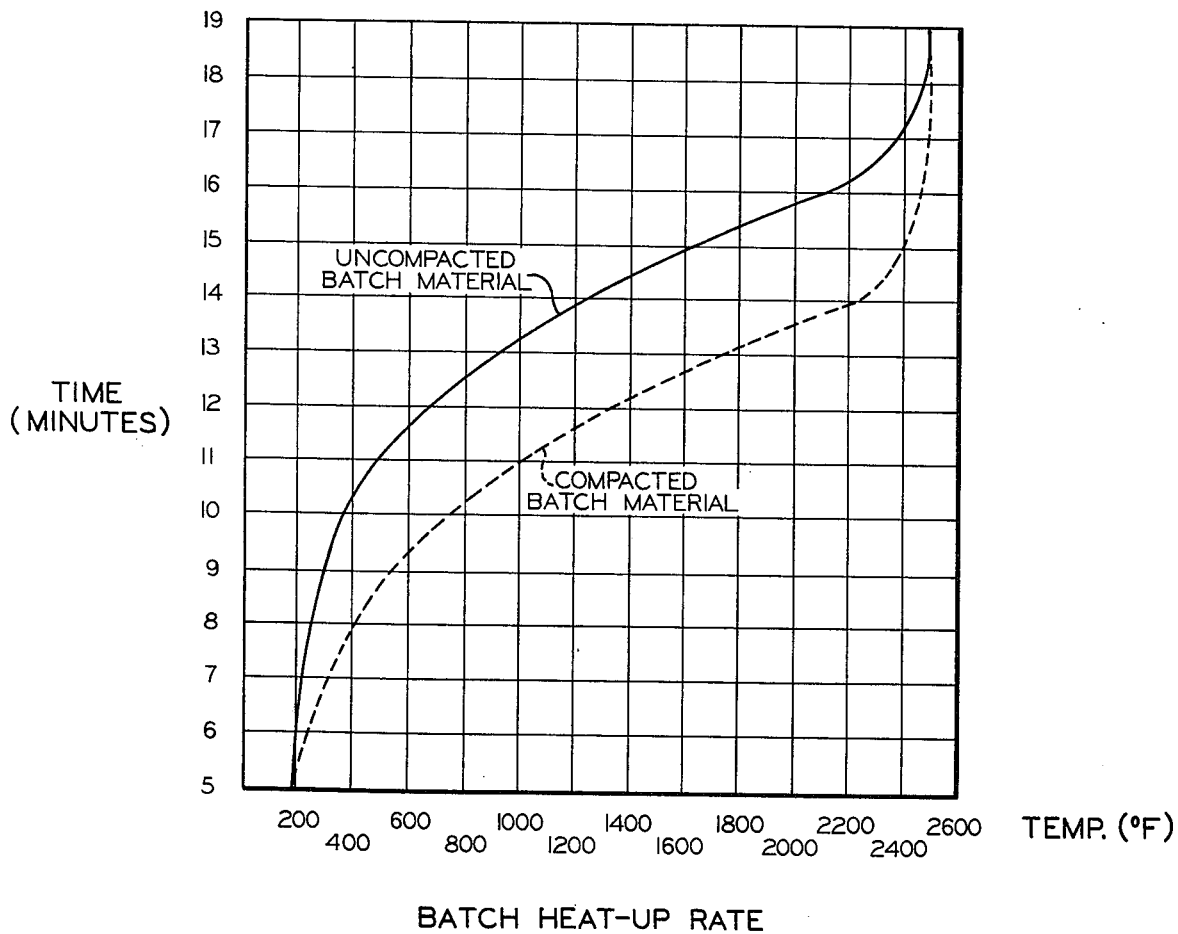
FIG. 8 is a graph, plotting temperature versus time, which compares the heat-up rate of compacted and uncompacted batch material.

Referring now to FIG. 8, as illustrated therein, laboratory tests have shown that during the first 5 minutes of heat application, the heat-up rate for uncompacted and compacted batches of glass making materials is substantially identical. Thereafter, however, it will be observed from the graph that the compacted glass making materials heat up more rapidly than the uncompacted glass making materials, thus reducing the time required for compacted glass making materials to reach their melting temperature. As previously mentioned, practice has shown that when raw granular batch material is compacted and advanced into the furnace, in accordance with the method of the invention, a blanket of compacted batch will be completely melted in the vicinity of the third port of the furnace. On the other hand, a blanket of uncompacted batch material that is formed in a conventional manner, and pushed into the furnace on the same cycle as employed in practicing the invention, the uncompacted batch material will not be completely melted until it is in the vicinity of the fifth port of the melting furnace.

It is to be understood that the form of the invention herewith shown and described is to be taken as an illustrative embodiment only of the same and that various changes in the shape, size and arrangement of parts as well as various procedural changes may be resorted to without departing from the spirit of the invention.

We claim:
1. In a glass melting furnace of the type having a melting chamber containing a bath of molten glass and a batch feeding apparatus for loosely depositing glass making materials in a transversely extending row on the surface of the molten glass, the improvement comprising: means for periodically pressing said row of loosely deposited glass making materials against the surface of said molten glass for compacting said row of glass making material, and means for advancing said pressing means toward said melting chamber wherein said row of glass making materials is bodily moved along the surface of said molten glass by said pressing means said pressing means includes a pressing member and said advancing means includes means for moving said pressing member from a raised attitude to a lowered attitude to compress said loosely deposited glass making materials between said pressing members and the surface of said molten glass bath.

2. A glass melting furnace of the type having a melting chamber containing a batch of molten glass as claimed in claim 1, wherein said moving means comprises a pivotally mounted frame, means for mounting said pressing member on said frame for reciprocating movement, and means for raising and lowering an end of said pivotally mounted frame.

3. A glass melting furnace of the type having a melting chamber containing a bath of molten glass as claimed in claim 1, including means for actuating said moving means when said pressing member has advanced to a position beneath said depositing apparatus by said advancing means.

4. A glass melting furance of the type having a melting chamber containing a bath of molten glass as claimed in claim 3, wherein said actuating means comprises a limit switch.

5. A glass melting furnace of the type having a melting chamber containing a bath of molten glass as claimed in claim 2, wherein said raising and lowering means comprises at least one power cylinder.

6. A glass melting furnace of the type having a melting chamber containing a bath of molten glass as claimed in claim 1, wherein said advancing means includes said pressing member and comprises means for reciprocally moving said pressing member parallel to the surface of said bath of molten glass.

7. A glass melting furnace of the type having a melting chamber containing a bath of molten glass as claimed in claim 6, including means for periodically actuating said advancing means to advance said pressing member in a raised attitude from a rest position to an intermediate position beneath said batch feeding apparatus, then in a lowered attitude from said intermeidate position to a terminal position, and then return said pressing member in a raised attitude from said terminal position to said rest position.

8. A glass melting furnace of the type having a melting chamber as claimed in claim 1, wherein said pressing member includes a skim blade for assisting movement of the batch materials.

9. A glass melting furnace of the type having a melting chamber as claimed in claim 6, wherein said means for reciprocally moving said pressing member comprises a chain and sprocket mechanism operatively connected to said pressing member and a reversing motor and gear reduction unit operatively connected to said chain and sprocket mechanism whereby said pressing member is advanced and retracted.

10. A method of compacting and feeding glass making materials to a glass making tank-type furnace having a pressing member and containing a bath of molten glass comprising the steps of: continuously depositing glass making materials loosely and generally in strip formation onto the surface of said molten glass in said furnace, periodically advancing said pressing member from a rest position in a raised attitude over said strip of deposited glass making materials, lowering said pressing member against said strip of deposited glass making materials to compact said strip of materials between it and the surface of the molten glass bath, and advancing said pressing member in its lower attitude to move said compacted glass making materials into the melting end of said furnace.

* * * * *

UNITED STATES PATENT AND TRADEMARK OFFICE
CERTIFICATE OF CORRECTION

PATENT NO. : 4,004,903
DATED : January 25, 1977
INVENTOR(S) : Lloyd W. Daman et al It is certified that error appears in the above-identified patent and that said Letters Patent are hereby corrected as shown below:

```
Col. 1, line  9, "mmore" should be --more--
Col. 2, line  4, "therefore" should be --therefrom--
Col. 2, line 22, "sequencees" should be --sequences--
Col. 2, line 58, "partically" should be --partially--
Col. 3, line 40, after "built" insert --up--
Col. 3, line 52, "doghouse" should be --doghouses--
Col. 4, line 45, after "one" insert --another--
Col. 5, line  4, "which" should be --with--
Col. 5, line 25, "doghouse" should be --doghouses--
Col. 6, line 40, "if" should be --is--
Col. 7, line 42, "and" should be --or--
Col. 10, lines 5 and 6, "intermeidate" should be
         --intermediate--
```

Signed and Sealed this

Twelfth Day of April 1977

[SEAL]

Attest:

RUTH C. MASON
*Attesting Officer*

C. MARSHALL DANN
*Commissioner of Patents and Trademarks*